United States Patent

Jones

[11] 3,938,564
[45] Feb. 17, 1976

[54] QUICK-RELEASE FUEL COUPLING FOR RACING CARS

[75] Inventor: Kendall Jones, North Hollywood, Calif.

[73] Assignee: Kaiser Aerospace and Electronics Corporation, Irvine, Calif.

[22] Filed: Jan. 6, 1975

[21] Appl. No.: 538,736

[52] U.S. Cl. ............ 141/352; 137/614.03; 285/165
[51] Int. Cl.² ........................................ B65B 3/07
[58] Field of Search ....................... 141/346–362, 291–302; 285/164, 165, 231; 277/30; 291/149.7; 137/614.03, 344; 244/135

[56] References Cited
UNITED STATES PATENTS

| | | | |
|---|---|---|---|
| 3,352,332 | 11/1967 | Swatek et al. | 141/349 |
| 3,734,149 | 5/1973 | Hansel | 141/350 |

*Primary Examiner*—Houston S. Bell, Jr.
*Attorney, Agent, or Firm*—Fulwider, Patton, Rieber, Lee & Utecht

[57] ABSTRACT

A quick-release coupling suitable for refueling racing cars and the like which avoids jamming of the coupling parts during rapid disconnection in a condition of misalignment between the coupling parts. A housing connected with a fuel receptacle includes an open passage in which is positioned a valve seat. A plunger is resiliently biased against the downstream side of the valve seat to close it. A hollow probe connected to a fuel supply, such as a dump can, includes a nose connected to the probe by a stem. A sliding sleeve surrounding the probe is resiliently biased into sealing contact with the nose to prevent fluid flow outwardly of the nose. During coupling, the probe is inserted into the passage so that the nose contacts the plunger to unseat it from the valve seat while at the same time bringing an outer surface of the sleeve into sealing relation against the upstream side of the valve seat. Further inward movement of the nose unseats it from the sleeve, thereby enabling fluid flow through the probe and valve seat into the receptacle. To prevent the nose jamming against the downstream side of the valve seat during withdrawal if the probe is withdrawn in an axially misaligned relation to the passage, a joint is provided in the stem enabling the nose to deflect so that it can pass easily out of the passage.

6 Claims, 6 Drawing Figures

QUICK-RELEASE FUEL COUPLING FOR RACING CARS

BACKGROUND OF THE INVENTION

This invention relates to a quick-release fueling coupling which is suitable, for example, for use in refueling racing automobiles and in other applications requiring rapid connection and disconnection of a liquid supply to a liquid receptacle. In particular, the invention relates to an improved fueling coupling of a similar type to that disclosed in the pending application of Ray E. Mingus and Ross M. Stuart for "Non-Latching, Dry-Break Fluid Coupling," Ser. No. 377,337 filed July 9, 1973, now U.S. Pat. No. 3,866,638 assigned to the same assignee as the present application.

In automobile racing, it is important to refuel very rapidly during pit stops and refueling is often performed using either dump cans or overhead fueling rigs. A dump can is a hand-held container of 8–12 gallon capacity having a funnel-like spout which is inverted and placed against the inlet of the automobile fuel tank. An overhead rig includes a flexible hose with an outlet pipe which is coupled manually to the inlet of the fuel tank. Using either of these systems, there is a problem of spillage of fuel which can occur when the spout of the dump can (or the outlet pipe of the overhead rig) is applied to the tank inlet and when it is subsequently removed.

The aforementioned application of Mingus et al discloses a dry-break coupling which can be rapidly connected and disconnected and which minimizes spillage of fuel. Such prior coupling includes a housing connected to the vehicle tank defining an open-ended passage in which is positioned a valve seat. A spring-loaded plunger is resiliently biased against the downstream side of the valve seat to close it. A probe, connected to the refueling source, is provided with a nose connected to the probe by a stem. A sliding sleeve surrounding the probe is resiliently biased into sealing contact with the nose to prevent fuel flow outwardly of the probe. During refueling, the probe is inserted into the passage whereupon the nose forces the plunger away from the valve seat while at the same time the end of the sleeve seats against the upstream side of the valve seat. Further inward motion of the probe, causing the nose to pass through the valve seat, unseats the nose from the sleeve so that fuel can flow through the probe and the valve seat into the receptacle.

Although such prior coupling has proved generally satisfactory, certain problems could be encountered from time to time. For example, after the nose has passed through the valve seat, it is in a position where it may become trapped or jammed against the downstream side of the valve seat if the probe is hurriedly withdrawn at a time when it is substantially out of axial alignment with the passage.

Another problem with the prior device could arise during withdrawal because the plunger seated on the downstream side of the valve seat at a time when the nose and adjacent portions of the sleeve were still seated on the end of the plunger and the upstream side of the valve seat, respectively, leaves no substantial void space between them. Such a condition, with atmospheric pressure acting on the opposite side of the probe, could create a suction lock between the coupling parts requiring a substantial outward pull (in the order of 75–100 pounds) to pull the probe out of the passage.

SUMMARY OF THE INVENTION

A quick-release fueling coupling, constructed in accordance with the invention, is intended to eliminate the possibility of the probe element of the coupling from becoming trapped against the downstream side of the valve seat when the probe is withdrawn at any axial inclination to the passage. In addition, the probe and plunger are so constructed as to avoid creating a suction condition between them in their engaged condition, which could hinder easy withdrawal of the probe.

In more detail, the quick-release coupling includes a housing connected with the fuel tank having a passage in which is situated a valve seat. A plunger, resiliently biased against the downstream side of the valve seat, closes it. A hollow probe connected at one of its ends to the fuel supply (e.g., a dump can) is provided with a nose connected to the probe by a stem. A sliding sleeve surrounding the probe is resiliently biased into sealing contact with the nose to prevent fluid flow through the probe. When the probe is inserted into the passage, the nose comes into contact with the plunger and unseats it from the valve seat. On continued insertion, the leading end of the sleeve reaches the upstream side of the valve seat, at which point further progress of the sleeve is arrested. Continued motion of the nose through the valve seat thereupon unseats the sleeve from the nose so that fuel can flow through the throat into the fuel tank. In the present invention, significant features are provided to facilitate rapid withdrawal of the probe from the housing once fueling is completed without the possibility of trapping the nose in the valve seat and without the creation of a suction zone tending to resist movement of the probe out of the passage.

To achieve the desirable result of preventing trapping of the nose, a universal joint is interposed in the stem, permitting the nose to pivot about two mutually perpendicular axes extending at right angles to the axis of the probe.

In an auto racing situation, the problem of trapping the nose behind the valve seat is particularly aggravated by a phenomenon which may be termed "rocking out." As the driver commences to accelerate the vehicle from rest on leaving the pit area, the mechanic may still be holding the dump can in the engaged fueling position. The jump forward of the vehicle causes an initial, relative angular motion, the rocking out, between the axis of the probe and the axis of the housing, preliminary to separation of the probe from the housing. It is in this initial phase that the nose of the probe, still positioned on the far side of the valve seat, can become trapped behind it due to the angular change in position caused by the rocking out.

With the present invention, if the nose becomes trapped behind the downstream side of the valve seat, the nose can pivot freely in whichever direction is necessary to let it ride along the downstream side of the valve seat and out through the throat of the valve seat without hindrance.

To prevent the end of the probe from becoming held in position in the passage by suction, the plunger is provided on its upstream side with a projection which extends a substantial distance upstream beyond the throat when the plunger is seated against the downstream side of the throat. Thus, as the probe commences to withdraw from the coupled position in which the sleeve is seated against the upstream side of the throat, the throat remains open while the probe withdraws. While the throat remains open, fluid, such as air, gaseous vapor and fuel, can pass through the throat to the upstream region below the nose within the passage to relieve any suction which might otherwise develop, thereby avoiding the development of pressure forces which could resist removal of the probe. The axial extent of the probe is such that the plunger does not seat against the valve seat to close the same until the probe has substantially reached the open end of the passage and can clear the same.

The foregoing, and other advantages and aspects of the invention are more fully described in the detailed description hereafter.

BRIEF DESCRIPTION OF THE DRAWINGS

A quick-release fueling coupling constructed in accordance with the preferred embodiment of the invention is illustrated in the accompanying drawings in which.

DETAILED DESCRIPTION

Figure 1:
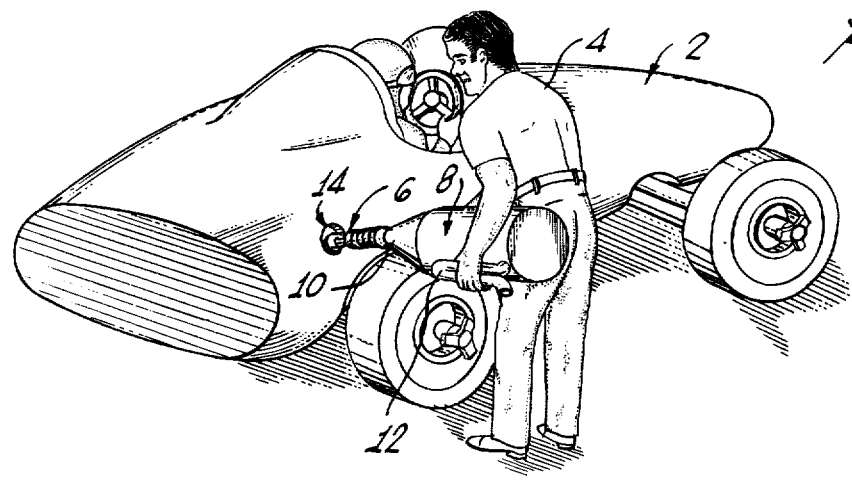
FIG. 1 is a perspective view showing the use of a quick-release coupling according to the invention, for transferring fuel from a dump can to the tank of a racing automobile.

Referring to FIG. 1 of the drawings, a quick-release fueling coupling constructed in accordance with the preferred embodiment is shown being utilized during the refueling of a racing automobile 2 by a pit mechanic 4.

The coupling includes a male probe element 6, which is attached to a conventional dump can 8. The dump can is a cylindrical drum having a funnel-like spout 10, which is turned during the fueling operation to face towards the vehicle fuel tank. The can 8 is vented by a convoluted, hollow tubing handle 12, connected to and communicating with the opposite end of the dump can. The other part of the fueling coupling comprises a female housing 14, connected with the automobile fuel tank.

The special advantages of the quick-release coupling of the present invention are that the probe can be rapidly withdrawn from the housing, even in a misaligned condition, without any risk of trapping portions of the probe 6 within the housing 14 and without the development of suction forces which might tend to hinder rapid withdrawal of the probe from the inlet.

The previously mentioned housing 14 is fixedly secured to the automobile and the probe 6 (FIG. 2) is secured to the outlet spout of the dump can (or to the outlet tube on the hose of an overhead fueling rig). The housing 14 is a generally cylindrical metal shell having a passage 16 extending axially through it which communicates at its inner end with the interior of the tank and is open at its outer end. A constricted annular valve seat 18 within the passage is spaced from the open end. A throat 20, through the valve seat 18, is closed by a valve plunger 22 which is resiliently biased against the lower, or downstream, side of the valve seat by a compression spring 24.

Figure 4:
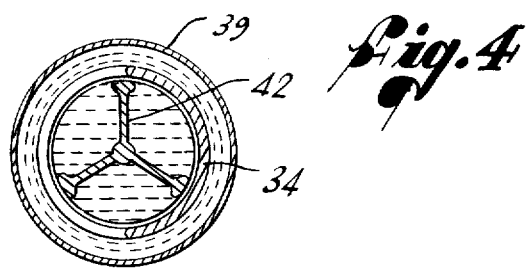
FIG. 4 is a cross-sectional, end view of a probe forming a part of the coupling shown in FIG. 2, taken along the lines 4—4 therein.

The probe 6 includes a hollow tubular upper body 26 connected by flexible tubing 28 to the spout of the dump can. At its downstream end, the probe body 26 receives a stem 30 which extends axially from the probe body 26 and supports a solid nose member 32 in spaced, concentric relation to the probe body 26. A sliding sleeve 34 mounted on the stem portion of the probe includes a resilient deformable collar 36 at its foward end which seats in sealing relation against the convexly curved upstream side of the nose member 32. The stem 30 comprises a three-legged extrusion (FIG. 4) with the legs disposed equally at 120° and each having a flange at its outer end contoured to slidingly support the sleeve 34 for axial motion. The stem 30 can, if desired, be of other cross-sectional configurations, such as square or triangular, for example. The sleeve 34 is biased resiliently against the nose member by a surrounding spring 38 which extends between the sleeve and the probe body 26. A flexible bellows is secured at one of its ends to the exterior of the sleeve 34 and at its opposite end to the probe body to prevent escape of fluid around the probe.

Figure 2:
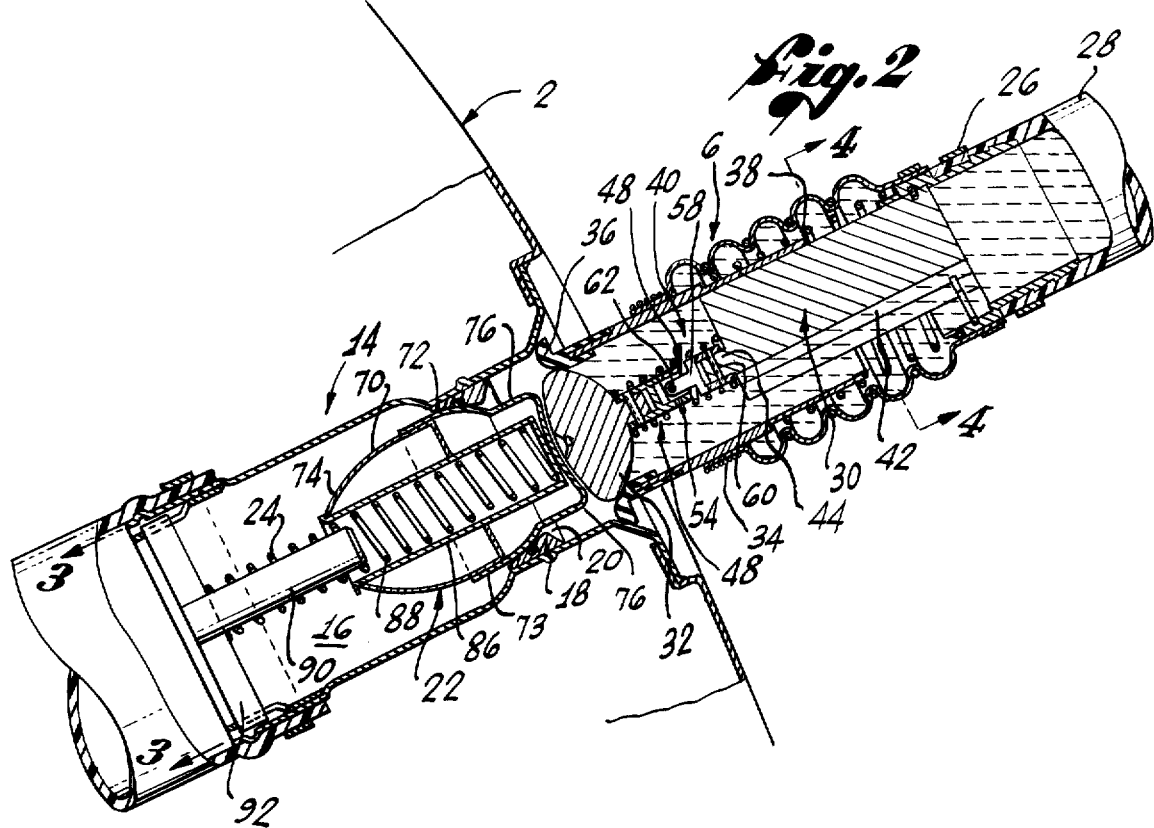
FIG. 2 is a cross-sectional, side view of the quick-release coupling shown in FIG. 1, showing an initial stage of engagement of the coupling parts prior to passage of fuel from the supply into the tank.
Figure 3:
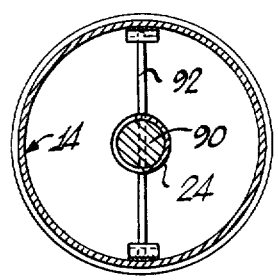
FIG. 3 is a cross-sectional, end view of a portion of a housing forming a part of the coupling shown in FIG. 2, taken along the lines 3—3 therein.

During coupling, the probe is forced through the open end of the passage 16 in the inlet housing, bringing the nose 32 into contact with the plunger 22, as shown in FIG. 2. Further inward movement of the probe unseats the plunger from the downstream side of the valve seat 18, opening a path to the fuel tank, although fuel cannot flow out of the probe at this time because the collar 36 is still seated against the nose 32. Further inward movement of the probe brings the resilient collar 36 into contact with the upstream side of the valve seat 18, whereupon further inward progress of the sleeve relative to the housing is prevented. As continued pressure is applied to the probe, the nose passes through the throat 20 of the valve seat, unseating itself from the resilient collar 36 so that fuel can flow from the dump can into the fuel tank.

Figure 6:
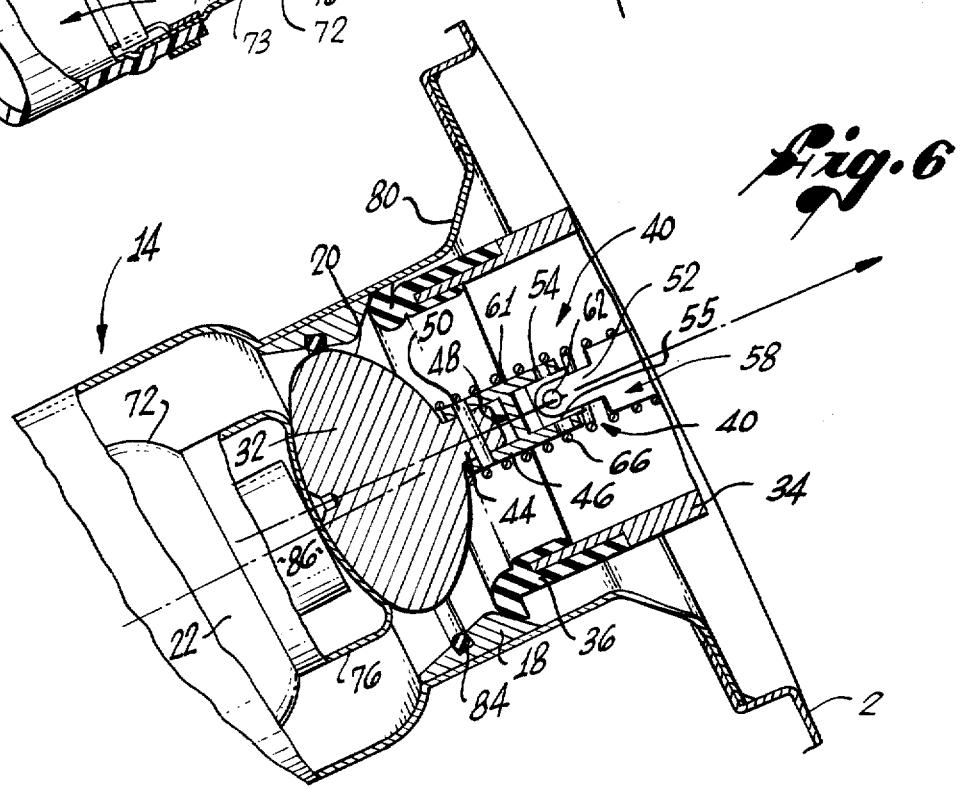
FIG. 6 is a cross-sectional, side view on an enlarged scale of a portion of the probe and housing shown in FIG. 5, during a stage of withdrawing of the probe from the housing while the probe and housing are axially out of alignment.

Of particular interest in the context of the present invention, is structure to prevent the nose 32 from becoming trapped or jammed against the downstream side of the valve seat during subsequent withdrawal of the probe if the probe should subsequently be withdrawn in an axially misaligned relationship to the axis of the passage 16 (FIG. 6). Such structure comprises a universal joint 40 mounted in the stem 30 between the nose member 32 and the probe body 26. The universal joint enables the nose member to pivot about at least two mutually perpendicular axes perpendicular to the axis of the probe so that the nose can deflect relative to the probe in such a manner to enable it to slide along the downstream side of the valve seat and pass easily through the throat without impeding the withdrawal of the probe from the inlet housing. As a result, ease of disconnection of the probe is greatly enhanced and the possibility of such mishaps as the driver leaving the pit with the probe still engaged with the automobile is avoided.

Considering the universal joint 40 (FIG. 6) in more detail, the nose 32 is provided at its center on the upstream side with an axially extending boss 44. The boss 44 has opposed, parallel flat sides which slidingly abut the inside faces of two arms 46 of a first yoke 48. A pin 50 extends through the arms 46 and the projection 44 to connect the first yoke 48 to the boss 44. At its upstream end, the first yoke 48 is provided with two arms 52 supporting a pin 54 extending in a direction perpendicular to the pin 50. In its central portion extending between the arms 52, the pin 54 has an enlarged central region 55. Similarly, the stem body 42 is provided at its downstream end with a boss 56 (FIG. 5) on which is mounted a second yoke 58 connected thereto by a pin 60. The second yoke 58 also has a pair of second arms 61 (FIG. 6) which support a pin 62 which passes through the enlarged central region 55 of the pin 54 at right angles thereto, thus creating a gimbal-type universal joint. Other types of universal joint, such as a ball and socket joint, can alternatively be used.

To contain the pins 50 and 60 securing the first and second yokes to their associated bosses, a spring 66 extends around and along the portion of the stem extending between the nose member 32 and the stem body 42. The spring 66 is sufficiently closely coiled adjacent its ends to prevent the pins securing the yokes, as well as the pins 54 and 62 from moving out of their mountings.

An additional function performed by the spring 66 is to exert a self-centering action on the nose member 32 which acts to realign it concentrically with the probe when the deflecting force exerted by engagement with the downstream side of the valve seat has ceased. This self-centering action is further assisted by the self-centering action of the collar 36 acting on the symmetrically curved upstream surface of the nose member 32.

A further significant feature of the invention resides in the configuration of the plunger 22 which is intended to avoid the trapping of the probe within the inlet housing due to the creation of vacuum on the downstream side of the probe as it is withdrawn. Some prior couplings have been designed to cause the plunger to close on the valve seat while the end of the sleeve was still located on the upstream side of the valve seat and the nose was flush against the end of the plunger, in order to provide a substantially void-free contact between the end of the probe and the upstream side of the valve seat and the plunger. With such an arrangement, atmospheric pressure acting on the opposite side of the probe and collar could create a net pressure force acting in a direction towards the interior of the inlet housing of a substantial magnitude, as much as 75–100 pounds, which would continue to act throughout the withdrawal of the probe until the probe cleared the opening.

To avoid this, and hence make probe withdrawal easier, the plunger 22 (FIGS. 2, 5 and 6) of the invention is configured to maintain an opening between the valve seat 18 and the plunger until the probe has substantially cleared the inlet housing, thereby enabling fluid from the interior of the tank (such as air, fuel, vapor, and/or fuel) to flow through the downstream side of the withdrawing probe, thereby relieving any vacuum on the downstream side of the probe which could hamper withdrawal. In more detail, the probe 22 is configured as a generally streamline-shape main body having: an upstream end 72 which is rounded and seals against the valve seat, an intermediate portion 73 of generally uniform diameter, and a tapering rear portion 74. Extending forwardly from the forward portion of the main body is a cylindrical projection 76 having a closed forward end concavely dished to conform to the convex curved surface of the nose member 32. The axial length of the projection 76 is sufficient to hold the upstream end 72 of the plunger 22 out of contact with the downstream side of the valve seat 18 until such time as the nose member 32 is about to clear the inlet housing. In the preferred embodiment, the inlet housing 14 is provided with a beveled rim 80 (FIG. 2) leading into the passage 16, and it is not until the nose member reaches approximately to the beveled portion 80 during withdrawal that the upstream end 72 of the plunger seats on the downstream side of the valve seat 18. Prior to seating, fluid from the interior of the tank can flow through the valve seat between its downstream side and the adjacent portion 72 of the plunger to prevent the creation of vacuum on the downstream side of the probe as it is withdrawing.

To ensure a liquid-tight seal of the plunger body against the valve seat, a circular O-ring 84 (FIG. 6) is mounted in a groove in the downstream side of the valve seat 18 and extends into sealing contact with the upstream end 72 of the plunger in its seated condition.

In the preferred embodiment, the forward portion 72 of the main body of the probe and the projection 76 are formed integrally from sheet metal and are secured by bonding, welding or the like to the remaining portions of the main body comprising another sheetmetal shell.

Figure 5:
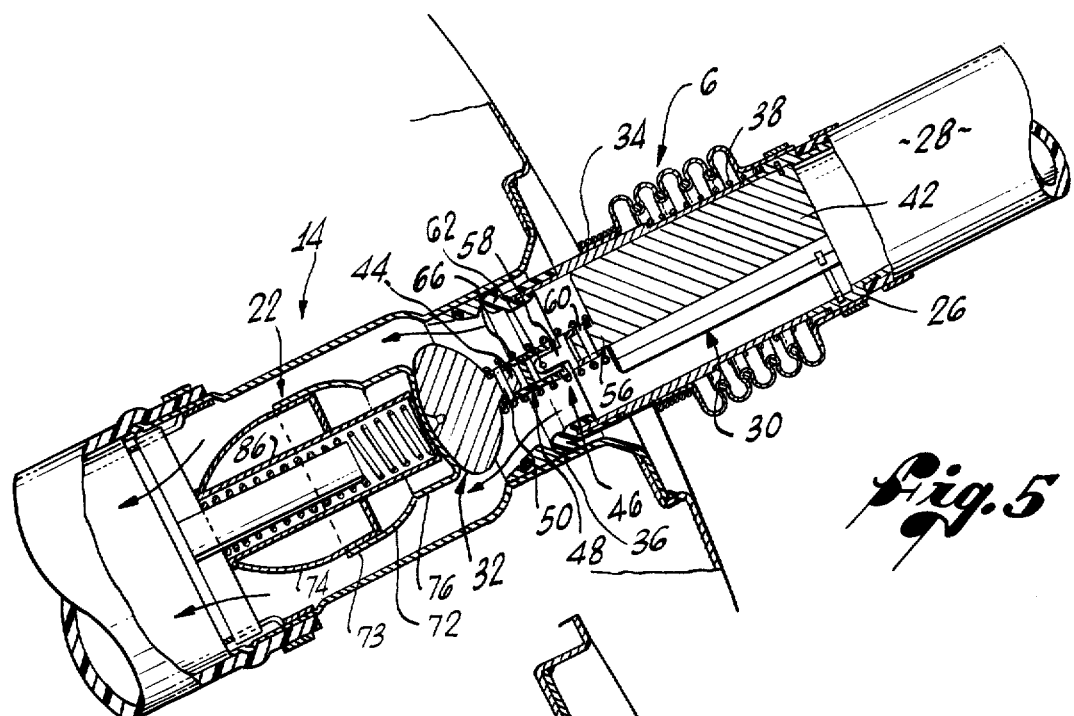
FIG. 5 is a cross-sectional, side view of the coupling shown in FIG. 2, but with the parts of the probe and housing shown in a fully coupled condition.

The plunger 22 is open at its rear end and a rearwardly open metal cylinder 86 (FIG. 2) extends axially within and is fixedly connected to the plunger body. Loosely received within the cylinder 86, extending outwardly through its open end, is a compression spring 88 which extends over and around a stationary, axially extending, guide rod 90. The guide rod 90 is mounted on a support beam 92 which extends diametrically across the interior of the housing 14 at its rearward end and is fixedly secured thereto. In use, as the plunger is depressed, the cylinder 86 telescopes about the guide rod 82, with the spring 88 becoming compressed (FIG. 5).

Although the invention has been described with reference to one preferred embodiment, it will be appreciated that many additions, deletions, substitutions and modifications may be made withough departing from the spirit of the invention described herein and defined in the appended claims.

I claim:

1. A releasable coupling for connecting a fluid supply unit to a fluid receiving unit to minimize spillage of fluid during coupling and uncoupling, comprising:
   a housing connected with one of the units;
   a passage in said housing communicating with the one unit and having an open end;
   a valve seat in said passage having upstream and downstream sides facing toward and away from the open end thereof, respectively;
   a plunger resiliently biased against the downstream side of said valve seat to close the same;
   a tubular probe connected at one of its ends with the other of the units;
   a nose;

a stem connected to said probe supporting said nose in concentric, spaced adjacent relation to the opposite end of said probe;

a sliding sleeve surrounding said probe resiliently biased into sealing contact with said nose at one end of said sleeve to prevent fluid flow outwardly of said probe, said probe being insertable into said passage to move said nose against said plunger thereby unseating the same from said valve seat, insertion of said probe seating an outer peripheral surface of said sleeve against the upstream side of said valve seat, further inward movement of said nose through said valve seat separating said sleeve from said nose to enable fluid flow through said probe and said valve seat; and joint means mounted in said stem for enabling said nose to move freely out of concentric alignment with said probe thereby enabling said nose to move out of a trapped position against the downstream side of said valve seat when said probe is withdrawn in a condition of axial misalignment relative to said passage.

2. A releasable coupling as defined in claim 1, wherein said joint means comprises:

a universal joint mounted in said stem enabling portions of said stem on opposite sides of said joint to pivot relative to each other about at least two mutually perpendicular axes at right angles to the axis of said stem.

3. A releasable coupling as defined in claim 1, further including:

self-centering, sealing surfaces on said nose and said one end of said sleeve whereby, when said sleeve engages said nose, said nose is biased to a condition of concentric alignment with the axis of said probe.

4. A releasable coupling as defined in claim 1, further including:

an enlarged shoulder on said stem spaced on an opposite side of said joint means from said nose facing theretowards; and a spring surrounding said stem and said joint means extending between said shoulder and said nose, said spring exerting a biasing action tending to center said nose concentrically with said stem.

5. A releasable coupling for connecting a fluid supply unit to a fluid receiving unit to minimize spillage of fluid during coupling and uncoupling, comprising:

a housing connected with one of the units;

a passage in said housing communicating with the one unit and having an open end;

a valve seat in said passage having upstream and downstream sides facing toward and away from the open end thereof, respectively;

a plunger resiliently biased against the downstream side of said valve seat to close the same, said plunger including:

a main body positioned concentrically in said passage, said main body adjacent its upstream end seating against the downstream side of said valve seat, a projection mounted on said main body extending through said valve seat in an upstream direction;

a tubular probe connected at one of its ends with the other of the units;

a nose;

a stem connected to said probe supporting said nose in concentric, spaced relation adjacent relation to the opposite end of said probe;

a sliding sleeve surrounding said probe resiliently biased into sealing contact with said nose at one end of said sleeve to prevent flow outwardly of said probe, said probe being insertable into said passage to move said nose against said projection thereby unseating said main body from said valve seat, insertion of said probe seating an outer peripheral surface of said sleeve against the upstream side of said valve seat, further inward movement of said nose through said valve seat separating said sleeve from said nose to enable fluid flow through said probe and said valve seat, said projection, during withdrawal of said probe, holding said main body out of sealing contact with the downstream side of said valve seat until after said sleeve has moved out of sealing contact with the upstream side of said valve thereby avoiding the creation of a vacuum impeding withdrawal of said probe from said passage.

6. A releasable coupling as defined in claim 5, wherein said main body is of generally streamline-shape having its wider dimension at the upstream end and wherein said projection is generally cylindrical and extends vertically to a location spaced above the upstream side of said valve seat when said main body is seated against the downstream side of said valve seat.

* * * * *